US008065206B2

(12) United States Patent
Thomas

(10) Patent No.: US 8,065,206 B2
(45) Date of Patent: Nov. 22, 2011

(54) BYTE-BASED METHOD, PROCESS AND ALGORITHM FOR SERVICE-ORIENTED AND UTILITY INFRASTRUCTURE USAGE MEASUREMENT, METERING, AND PRICING

(75) Inventor: Jeffery Darrel Thomas, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 12/180,039

(22) Filed: Jul. 25, 2008

(65) Prior Publication Data

US 2008/0281736 A1 Nov. 13, 2008

Related U.S. Application Data

(63) Continuation-in-part of application No. 11/087,536, filed on Mar. 23, 2005.

(51) Int. Cl.
  *G07F 19/00* (2006.01)
  *H04M 15/00* (2006.01)
(52) U.S. Cl. ........... 705/34; 726/28; 726/29; 726/30; 713/320; 713/300; 713/340
(58) Field of Classification Search .......... 705/1, 8; 713/340, 320; 700/291; 702/60, 186, 61, 702/176; 718/104
See application file for complete search history.

(56) References Cited

U.S. PATENT DOCUMENTS

| | | | |
|---|---|---|---|
| 6,996,508 B1 | 2/2006 | Culp et al. | |
| 7,219,069 B2 * | 5/2007 | Fouquet | 705/8 |
| 7,313,827 B2 * | 12/2007 | Kelley et al. | 726/28 |
| 7,373,221 B2 * | 5/2008 | Lal | 700/291 |
| 7,630,857 B2 * | 12/2009 | Shogano et al. | 702/176 |
| 2003/0236745 A1 * | 12/2003 | Hartsell et al. | 705/40 |
| 2004/0128266 A1 | 7/2004 | Yellepeddy et al. | |
| 2005/0080696 A1 * | 4/2005 | Bagchi et al. | 705/35 |
| 2005/0149940 A1 * | 7/2005 | Calinescu et al. | 718/104 |
| 2006/0036520 A1 * | 2/2006 | O'Neill | 705/34 |
| 2006/0161450 A1 * | 7/2006 | Carey et al. | 705/1 |
| 2007/0225989 A1 | 9/2007 | Whitley et al. | |
| 2008/0133764 A1 * | 6/2008 | Agarwal et al. | 709/229 |
| 2008/0288193 A1 * | 11/2008 | Claassen et al. | 702/61 |
| 2009/0006878 A1 * | 1/2009 | Borghetti et al. | 713/340 |

(Continued)

OTHER PUBLICATIONS

Alok Gupta, Leigh L. Linden, Dale O. Stahl, & Andrew B. Whinston. (2001). Benefits and Costs of Adopting Usage-Based Pricing in a Subnetwork. Information Technology and Management, 2(2), 175. Retrieved Sep. 8, 2011, from ABI/INFORM Global.*

(Continued)

*Primary Examiner* — Matthew S Gart
*Assistant Examiner* — Olusegun Goyea

(57) ABSTRACT

A method for accounting for data processing system service usage is provided. The method comprises monitoring a total environmental consumption related to an information technology resource, determining a percentage of the information technology resource used by a customer, and determining an environmental factor corresponding to a product of the percentage of the information technology resource used by the customer with the total environmental consumption related to the information technology resource and integrating the product over a billing period. The method further comprises determining an information technology factor corresponding to a sum of a total network usage, a total storage usage, and a total processor usage for the customer over the billing period, determining a total bill for the customer according to the environmental factor and the information technology factor, and storing the total bill for the customer in a computer-readable medium.

19 Claims, 4 Drawing Sheets

U.S. PATENT DOCUMENTS

| | | | | |
|---|---|---|---|---|
| 2009/0007128 A1* | 1/2009 | Borghetti et al. | | 718/104 |
| 2009/0112522 A1* | 4/2009 | Rasmussen | | 702/186 |
| 2009/0228726 A1* | 9/2009 | Malik et al. | | 713/320 |
| 2009/0235097 A1* | 9/2009 | Hamilton et al. | | 713/320 |
| 2009/0259417 A1* | 10/2009 | Pfeiffer | | 702/60 |
| 2010/0005331 A1* | 1/2010 | Somasundaram et al. | | 713/340 |

OTHER PUBLICATIONS

Paul Korzeniowski. (1999, Aug.). New systems help support chargeback. Business Communications Review, 29(8), 51-54. Retrieved Sep. 8, 2011, from ABI/INFORM Global.*

Broadbent, Marianne. (2003, Sep.). Chargeback—How far should you go? CIO Canada, 11(9). Retrieved Sep. 8, 2011, from ABI/INFORM Trade & Industry.*

Notification of Transmittal of the International Search Report and the Written Opinion of the International Searching Authority or the Declaration, dated Apr. 26, 2010 from counterpart PCT application Serial No. PCT/US2009/051205 filed Jul. 21, 2009 (4 pages).

Written Opinion of the International Searching Authority, dated Apr. 26, 2010 from counterpart PCT application Serial No. PCT/US2009/051205 filed Jul. 21, 2009 (4 pages).

International Search Report, dated Apr. 26, 2010 from counterpart PCT application Serial No. PCT/US2009/051205 filed Jul. 21, 2009 (4 pages).

* cited by examiner

US 8,065,206 B2

BYTE-BASED METHOD, PROCESS AND ALGORITHM FOR SERVICE-ORIENTED AND UTILITY INFRASTRUCTURE USAGE MEASUREMENT, METERING, AND PRICING

CROSS-REFERENCE TO OTHER APPLICATION

This application is a continuation in part of U.S. patent application Ser. No. 11/087,536, filed Mar. 23, 2005, which is hereby incorporated by reference.

TECHNICAL FIELD

The present invention is directed, in general, to techniques for providing and billing computer resources and services.

BACKGROUND OF THE DISCLOSURE

Computer service vendors provide a wide range of services, and an increasing number of companies are becoming consumers of the various services. Services available today include telecom (telecommunications, datacenter network services, mobile/edge communications services), computational services (compute), both application layer and infrastructure layer, and data storage (storage).

Unfortunately, billing standards and methods differ greatly between different vendors and between different types of services. Different types of services may be billed by flat-rate, by the day, week, or month, by the byte (or multiple thereof), or on a per-minute basis. Other factors include data speed and tiered service levels.

These varying billing methods cause unnecessary duplication, overhead, and other management issues.

There is, therefore, a need in the art for a system, process and data format for unified billing for computing services.

SUMMARY OF THE DISCLOSURE

An embodiment provides system, method, and computer program product for byte-based utility computing pricing. This embodiment provides a unified pricing unit for storage, network transport, and processing power, enabling the provider to efficiently and effectively charge the consumer for use of computing power and resources.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, collect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
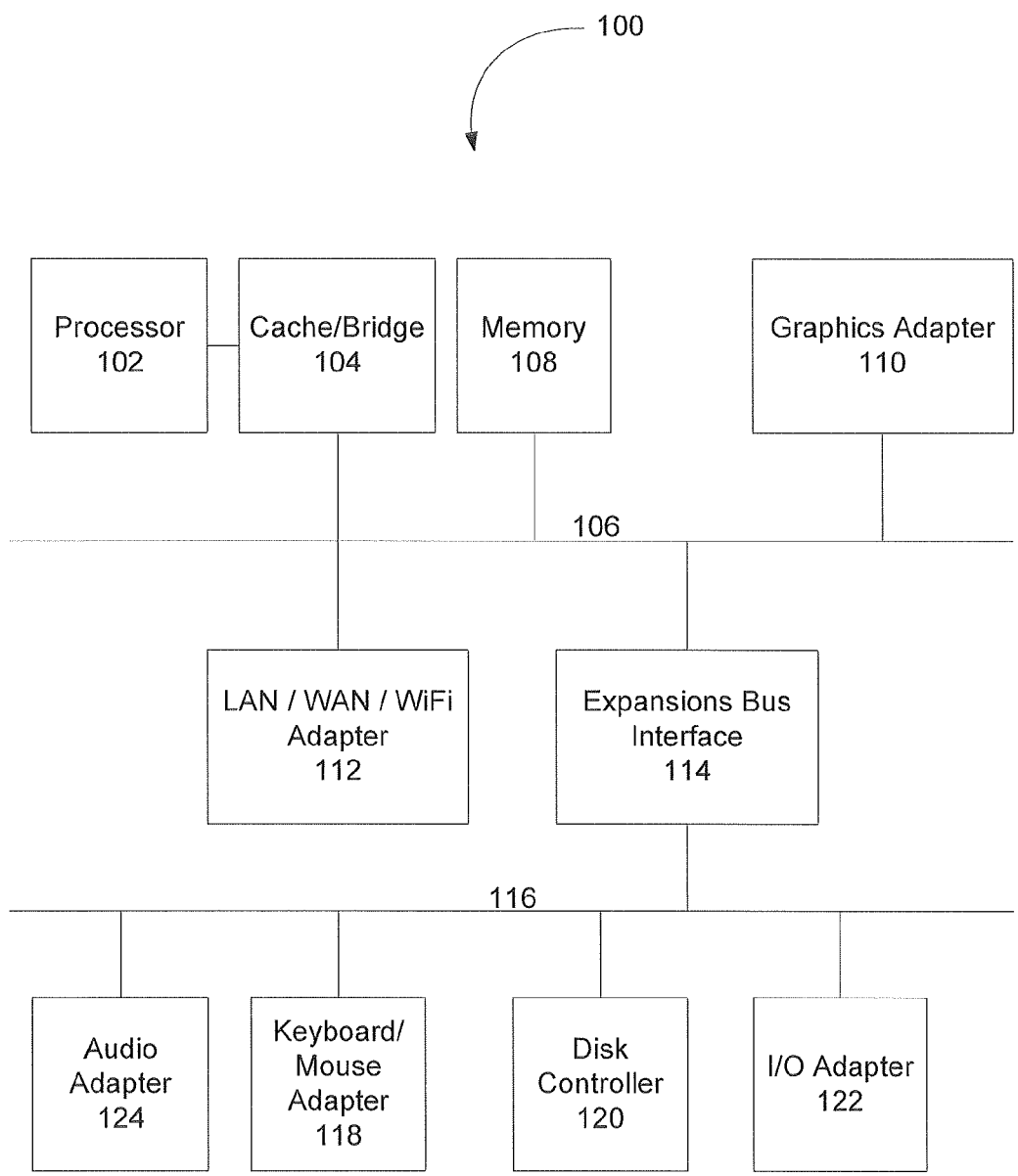
FIG. 1 depicts a block diagram of a data processing system in which an embodiment can be implemented.

FIG. 1 depicts a block diagram of a data processing system 100 in which an embodiment can be implemented. The data processing system 100 depicted includes a processor 102 connected to a level two cache/bridge 104, which is connected in turn to a local system bus 106. Local system bus 106 may be, for example, a peripheral component interconnect (PCI) architecture bus. Also connected to local system bus 106 in the depicted example are a main memory 108 and a graphics adapter 110. The graphics adapter 110 may be connected to display 111.

Other peripherals, such as a local area network (LAN)/Wide Area Network/Wireless (e.g., WiFi) adapter 112, may also be connected to local system bus 106. An expansion bus interface 114 collects local system bus 106 to an input/output (I/O) bus 116. I/O bus 116 is connected to a keyboard/mouse adapter 118, a disk controller 120, and an I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is an audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

An exemplary embodiment provides system, method, and computer program product for byte-based utility computing pricing. This embodiment provides a unified pricing unit for storage, network transport, and processing power, enabling the provider to efficiently and effectively charge the consumer for use of computing power and resources.

The exemplary embodiments are focused on billing for use of the infrastructure layer of computing. Those of skill in the art will recognize that the claimed system and method can be modified for use in billing for use of the application tier of the computing stack, based upon the application context.

Electricity provides a good example of the infrastructure/application division. When people buy electricity, they receive energy in a very fundamental form. Electricity itself is not very useful. It needs compliments to make it valuable. The electricity user buys other things like appliances, air conditioners, lights, computers, etc.—"applications"—in order to make something truly useful.

At the infrastructure layer in the electricity world, however, power is provided in a standards-based fashion (e.g., either alternating or direct current format, at a certain voltage, etc.). These standards are necessary to have a variety of applications available, but the applications themselves are left up to the customers to choose.

Various embodiments described herein therefore define an analogous unit—a computing "kilowatt-hour". This unit can then be used to price a wide array of utility computing services. One example of the use of such a unit is the INFOWATT™ services of Electronic Data Systems Corporation.

At the infrastructure computing layer, a typical service provider fundamentally provides 3 types of service, as illustrated below with reference to FIG. 2: storing bits (storage); moving bits (telecommunications in all forms); and transforming some bits into new bits (compute processing).

The bit is the fundamental unit of measurement for information, defined as the amount of information in a system having two possible states. Bytes, Kilobytes (KB), Megabytes (MB), Gigabytes (GB), Terabytes (TB), Petabytes (PB), etc., are all just aggregations of bits.

Figure 2:
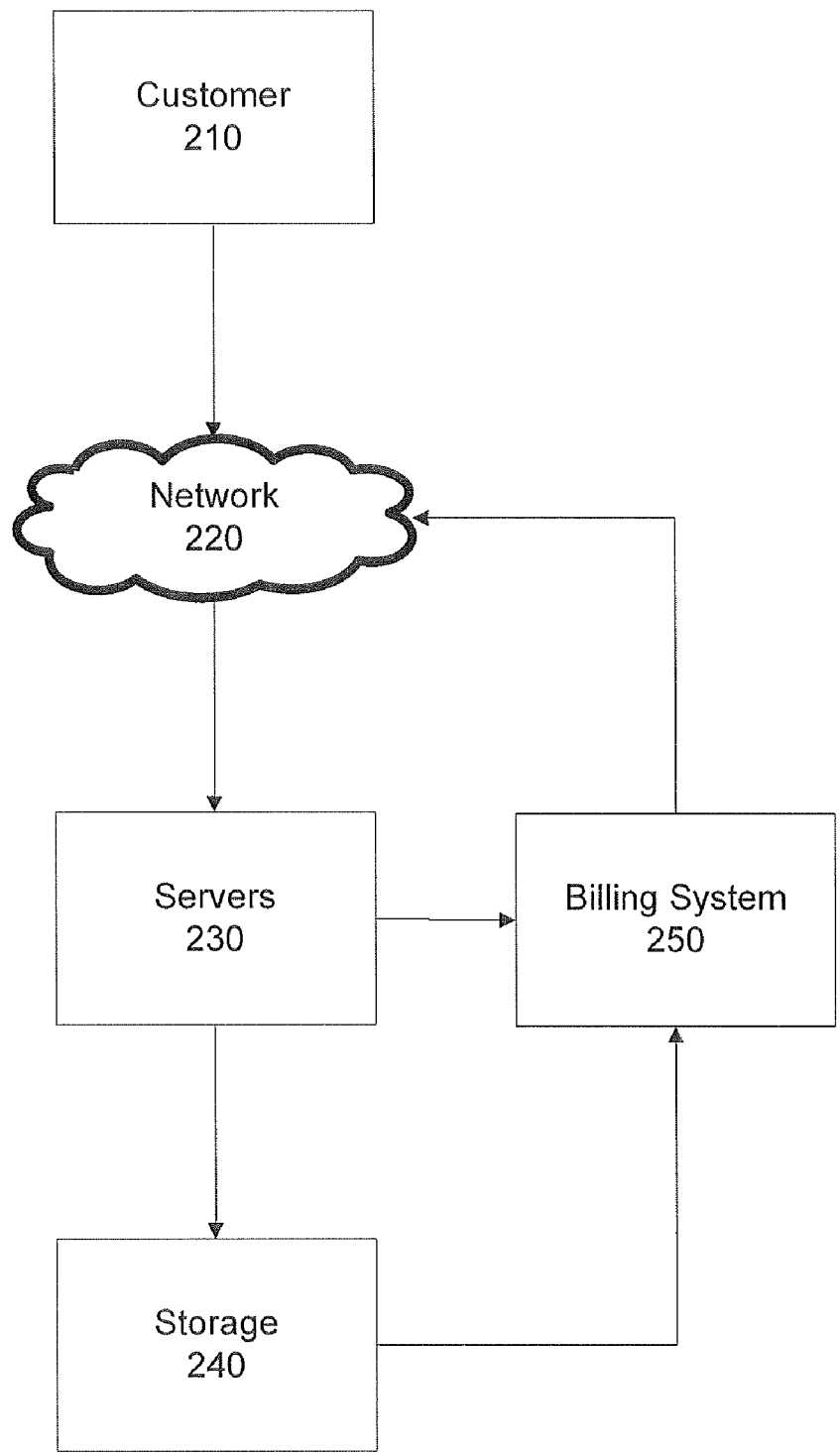
FIG. 2 depicts a block diagram of a simple Information Technology (IT) system in which an embodiment can be implemented.

FIG. 2 depicts a block diagram of a simple IT system in which an embodiment can be implemented. This figure shows a customer system 210, connected to a network 220. Network 220 can be single or multiple networks, a public network, a private or secure network, or a combination of these. Customer system 210 can be implemented, for example, as a data processing system 100.

Also connected to network 220 are servers 230. Servers 230 can be implemented in single or multiple servers, and while shown as a single block for clarity, servers 230 can be located in multiple different locations. Servers 230 can be implemented, for example, as a data processing system 100.

Connected to servers 230 is a storage 240, for storing data. Storage 240 can be multiple storage devices, as known to those of skill in the art, and can be in multiple different locations. In other embodiments, storage 240 is connected directly to network 220.

Billing system 250 is connected to communicate with and monitor network 220, servers 230, and storage 240, as described below. Note that billing system 250 need not be directly attached to any of these devices, as long is it can monitor byte usage as described herein.

In a computing services definition that focuses on outputs rather than the traditional inputs of servers, routers, etc., a universal computing unit is then rationally related to bits and time. This is because the provider is handling information (bits) over the course of time (hours, a month, etc.). This is similar to a kilowatt-hour, a Watt being Joules/s and an hour being 3600 s, so a kilowatt-hour is just another way to say 3,600,000 Joules. Joules are a measurement of energy, and Watts are a measure of the rate at which energy is supplied, or power. This is how a byte-based pricing method relates to the above listed computing functions, according to an embodiment.

Storage: Take the function of gigabits per day over time, and integrate this function over one month's time to compute bits (or GB, etc.). Note that the one-month figure is exemplary; the storage use can be computed over any appropriate time period. Total storage for a customer is shown generically in this embodiment as storage 240.

$$\text{Total Storage} = \int \frac{GB}{\text{day}} dt$$

Telecommunications: Similar to storage, measure the rate at which bits move across the wire or through the network devices over a month and arrive at an overall bit count by integrating the rate (often measured in megabits per second) over time. Telecom usage over network 220 is monitored, in the above embodiment, by billing system 250. In one embodiment, if network 220 is a public network, the portion of the bits that actually move across the private network is monitored.

Total Telecom=∫Mbps dt.

Processing: Like the other computing functions, computer processors handle chunks of bits. The MIPS, clock speeds, etc., all eventually translate into bits once it is determined how many bits per instruction the machine can handle (e.g., bits/instruction*instructions/second*seconds=total bits processed). An exemplary embodiment includes a billing system 250 that meters the bit processing, and measures this at the process/customer level in a server system 230 where CPUs are all shared, a capability available in some of the latest virtual machine software, as known to those of skill in the art. The bit processing rate, in bytes per second, integrated over time yields the processed bits.

$$\text{Servers} = \int \frac{B}{s} dt.$$

As used herein, this basic unit will be referred to as an "information value unit" (IVU). Assume that 1 IVU is equal to 1 gigabyte (GB) of information (combined storage, telecommunications, and processing) in a given month. Of course, this value of the IVU is arbitrary for the sake of this discussion, and can be defined as needed for a particular application. Thus, a customer with 1 terabyte (TB) of storage who moved 5 GB of information through telecom and processed 60 GB through the provider's processors would be billed for the sum of these, or 1.065 MegaIVUs. The $/IVU price might vary based upon how different customers consume information management resources.

For example, assume that compute power is more valuable than storage and telecoms, a customer who tends to use more CPU resources might have a higher price. The provider can then periodically benchmark use patterns and adjust prices. Utilities do this, and the ability to throttle prices allows efficient adjustment to supply and demand conditions.

While bit- or byte-based pricing is known in data telecoms and storage systems, there is no precedent within for byte-based pricing of an integrated computing infrastructure service where the pricing for all aspects of the service, including processing, are byte-based.

The total cost to the customer, then, is a function of the sum of the three integrals for processing, storage, and telecom.

$$\text{Total cost to the customer} = \left( \int \frac{GB}{\text{day}} + \int Mbps + \int \frac{B}{s} \right) dt$$

Figure 3:
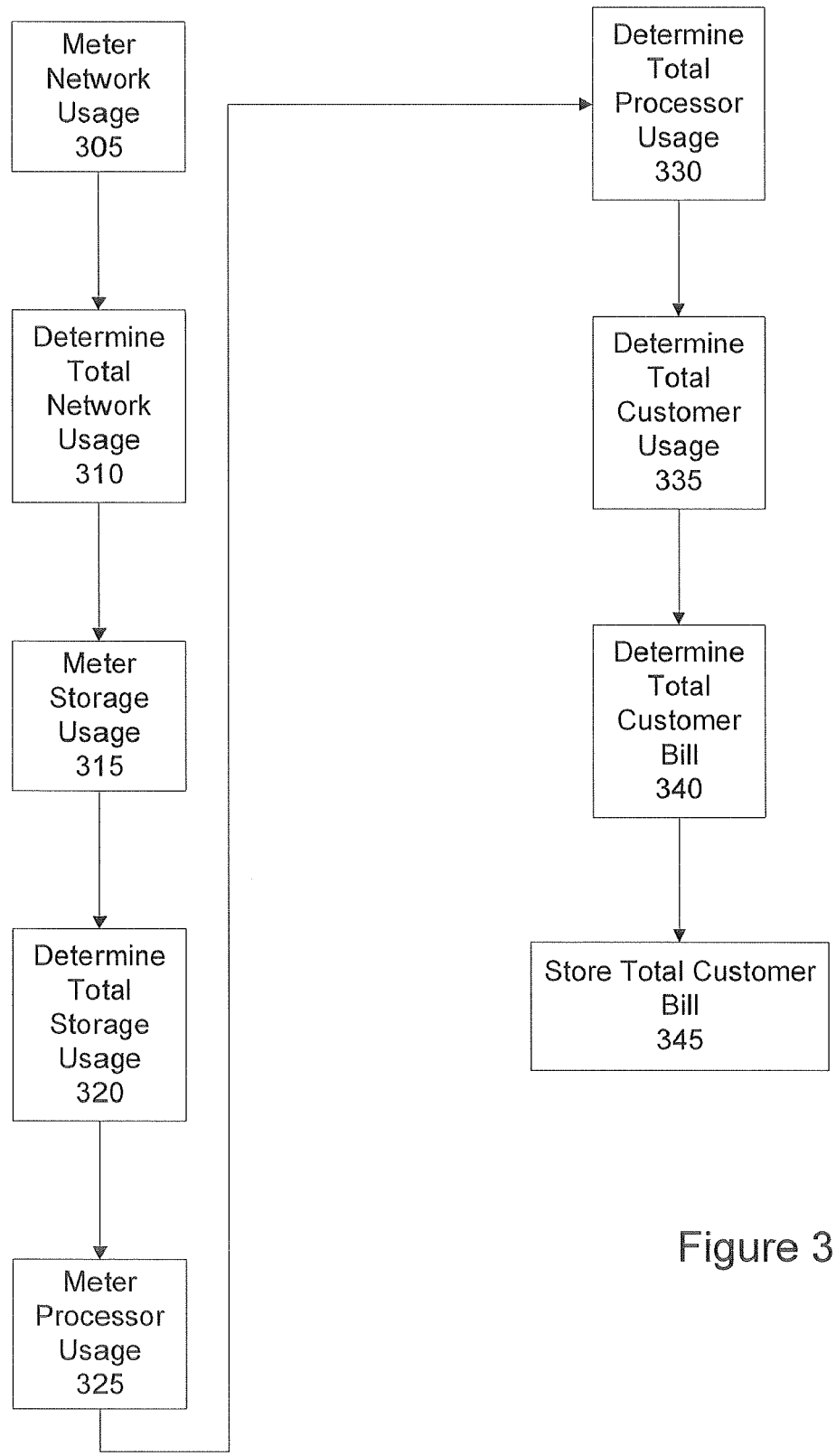
FIG. 3 depicts a flowchart of a process in accordance with an embodiment.

FIG. 3 depicts a flowchart of a process in accordance with an embodiment. This process assumes that a customer already has an account, and that all proper security and authentication measures are taken.

First, monitor the network usage (telecom) to determine the customer's usage in Mb/s (step 305). Next, integrate the network usage over the billing period (step 310), one month in this example, to determine a network usage total.

Next, monitor the storage usage to determine the customer's usage in GB/day (step 315). Next, integrate the storage usage over the billing period (step 320), one month in this example, to determine a storage usage total.

Next, monitor the processor usage to determine the customer's usage in B/sec (step 325). Next, integrate the storage processor over the billing period (step 330), one month in this example, to determine a processor usage total.

Next, determine a total customer usage, by summing the network usage total, the storage usage total, and the processor usage total (step 335). Finally, determine a total customer bill (step 340), according to the total customer usage and a billing rate. The total customer bill is then stored, for example, in storage 240 (step 345). Either before or after being stored, the total customer bill also may be displayed, for example, on data processing system 100 or included as part of an invoice to the customer.

The total customer bill is not necessarily inclusive of all items that might be billed to the customer.

Of course, in alternate embodiments, each type of usage is billed at a different rate, and then the total bills for each can be summed. For example, suppose that processing is billed at a rate x, storage is billed at a rate y, and telecom is billed at a rate z. The total cost to the customer could be calculated as follows:

$$\text{Total cost to the customer} = \left( x \int \frac{GB}{\text{day}} + y \int Mbps + z \int \frac{B}{s} \right) dt.$$

Of course, the units by which each type of usage is monitored can be changed as needed, although the above embodiment indicates that each measurement should be byte-based, as can the time over which the usage is integrated. In other embodiments, instead of any integration, a simple running total of all usage is maintained. Those of skill in the art will recognize that not all steps described above need be performed in the order recited.

In some embodiments, the actual metering is not performed by the same system that performs the integrating and billing functions. In these embodiments, the metered usage data is received by the data processing system, and a computer program product then is used to process and calculate a total customer bill.

Additionally, in another exemplary embodiment, network 220 is used to monitor not only the amount of energy required to power the hardware providing the processing, storage, and telecom services but also the amount of energy required to power and cool the environment housing the hardware (i.e., the environmental consumption).

Relating the environmental consumption to the usage of IT resources over a period of time allows an enterprise (such as a single corporation with multiple departments) or a service provider (such as a single corporation providing services to multiple enterprises) to quantify a per service usage for these various services in a way that is more reflective of the actual cost of providing the services to a particular customer. A customer may be a department of an enterprise or an enterprise using services from a service provider. To that end, energizing bit processing can be calculated by taking a product of the percentage of IT used by a customer times the total IT Watts per day integrated over time. IT Watts refers to the sum of the IT factors (in this case, processing, storage, and telecom) plus the environmental consumption of the IT factors over a duration of time.

$$\text{Energize bit processing} = \int (\Sigma \% \text{ IT used} * \text{IT Watts/day}) dt.$$

Accordingly, in this embodiment, the total cost to the customer is a function of the sum of the four integrals for processing, storage, telecom and energizing bit processing.

Total cost to the customer =

$$\left( \int \frac{GB}{\text{day}} + \int Mbps + \int \frac{B}{s} + \int \left( \sum \% \text{ IT used} * \text{IT Watts/day} \right) \right) dt.$$

Furthermore, relating the environmental consumption to the usage of IT resources provides an indication of IT efficiency as well as an indication of the return on a particular infrastructure based on the usage of that infrastructure. IT efficiency can be expressed as a ratio of the sum of the three integrals for processing, storage, and telecom (i.e., the IT factors) divided by the energizing bit processing (i.e., the environmental factors) over a prospective duration.

$$\text{Efficiency Ratio} = \frac{ITFactors}{EnvironmentalFactors}.$$

The efficiency ratio provides an indication of the efficiency by comparing the amount of IT used to the environmentals consumed by the IT over time. The efficiency ratio can be used to determine a work-to-environmental efficiency and can be adjusted upward or downward according to the work-to-environmental efficiency, thereby optimizing the distribution of the usage of IT upwards or downwards relative to the constant consumption of environmentals by the associated IT—in essence, eliminating underutilized or overutilized IT as environmentals are consumed over time. Also, the efficiency ratio can be used in determining IT sprawl consolidation as well as return-on-investment (ROI)/total cost of ownership (TCO) efficiency rating.

Figure 4:
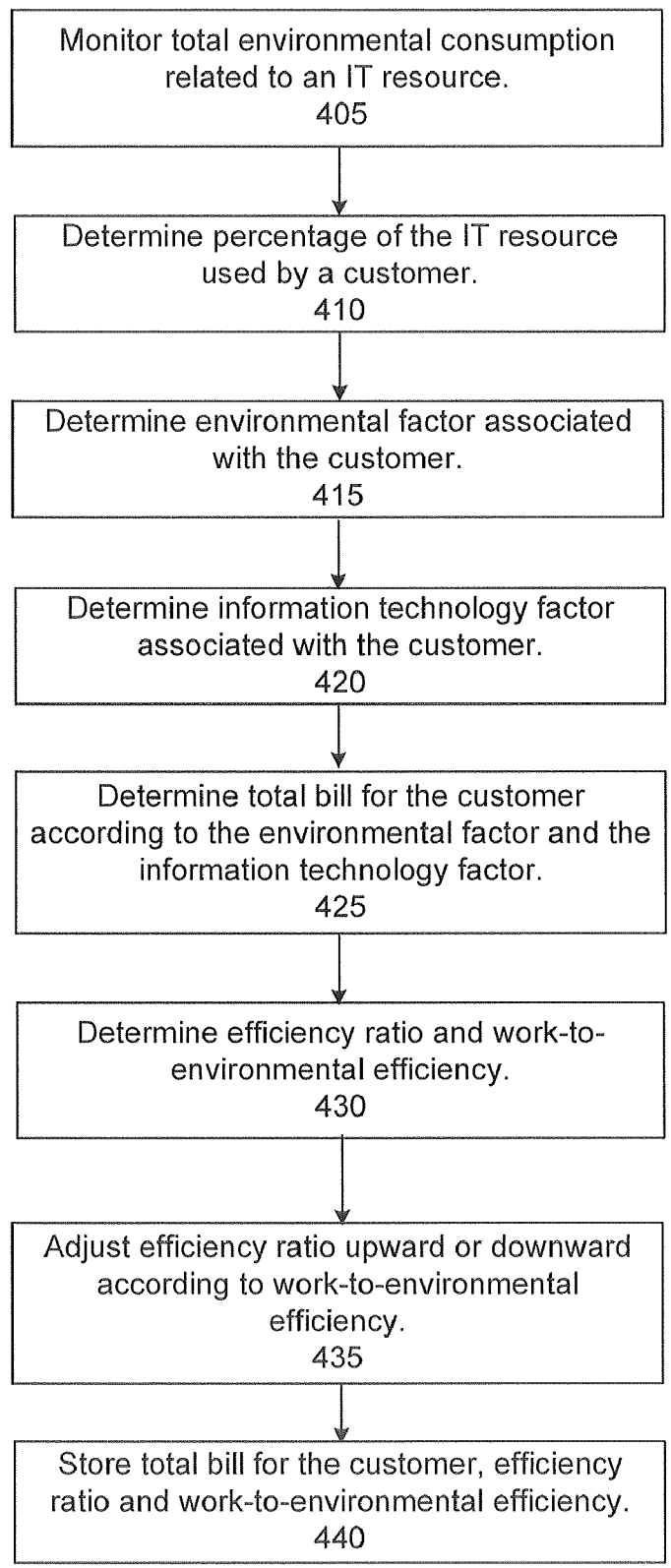
FIG. 4 depicts a flowchart of a process in accordance with another embodiment.

FIG. 4 depicts a flowchart of a process in accordance with another embodiment. Again, this process assumes that a customer already has an account, and that all proper security and authentication measures are taken.

First, monitor a total environmental consumption related to an information technology resource (step 405). Then determine a percentage of the information technology resource used by a customer (step 410).

Next, determine an environmental factor (i.e., energizing bit processing) by multiplying the percentage of the information technology resource used by the customer with the total environmental consumption related to the information technology resource and integrating the product over a billing period (step 415).

Next, determine an information technology factor by summing a total network usage, a total storage usage, and a total processor usage for the customer over the billing period (step 420).

Next, determine a total bill for the customer according to the environmental factor and the information technology factor (step 425).

Next, determine an efficiency ratio by dividing the information technology factor by the environmental factor and determine a work-to-environmental efficiency using the efficiency ratio (430) and adjust the efficiency ratio upward or downward according to the work-to-environmental efficiency (435).

The total customer bill, efficiency ratio, and work-to-environmental efficiency is then stored, for example, in storage 240 (step 440). Either before or after being stored, the total customer bill, efficiency ratio, and work-to-environmental efficiency also may be displayed, for example, on data processing system 100. The total customer bill also may included as part of an invoice to the customer while the efficiency ratio and work-to-environmental efficiency may be included, for example, in a report.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 or the IT system depicted in FIG. 2 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for accounting for data processing system service usage, comprising:
   with a computerized billing system, monitoring a total environmental consumption within an information technology resource;
   with a processor, determining a percentage of the information technology resource used by a customer;
   with a processor, determining an environmental factor corresponding to a product of the percentage of the information technology resource used by the customer with the total environmental consumption within the information technology resource and integrating the product over a billing period;
   with a processor, determining a unified pricing structure based on an information technology factor corresponding to a sum of a total network usage, a total storage usage, and a total processor usage for the customer over the billing period, using byte-based utility computing pricing;
   with a processor, determining a total bill for the customer according to the environmental factor and the information technology factor; and
   storing the total bill for the customer in a computer-readable medium.

2. The method of claim 1, further comprising determining an efficiency ratio by dividing the information technology factor by the environmental factor.

3. The method of claim 2, further comprising determining a work-to-environmental efficiency using the efficiency ratio.

4. The method of claim 1, wherein the network usage is metered in megabits per second.

5. The method of claim 1, wherein the storage usage is metered in gigabytes per day.

6. The method of claim 1, wherein the processor usage is measured in bytes per second.

7. A data processing system having at least a processor and an accessible memory, comprising:
a billing system that:
monitors a total environmental consumption within an information technology resource;
determines a percentage of the information technology resource used by a customer;
determines an environmental factor by multiplying the percentage of the information technology resource used by the customer with the total environmental consumption within the information technology resource and integrates the product over a billing period;
determines a unified pricing structure based on an information technology factor by summing a total network usage, a total storage usage, and a total processor usage for the customer over the billing period, using byte-based utility computing pricing; and
determines a total bill for the customer according to the environmental factor and the information technology factor.

8. The data processing system of claim 7, in which the billing system further determines an efficiency ratio by dividing the information technology factor by the environmental factor.

9. The data processing system of claim 8, in which the billing system further determines a work-to-environmental efficiency using the efficiency ratio.

10. The data processing system of claim 7, wherein the network usage data is metered in megabits per second.

11. The data processing system of claim 7, wherein the storage usage data is metered in gigabytes per day.

12. The data processing system of claim 7, wherein the processor usage data is measured in bytes per second.

13. A computer program product for accounting for data processing system service usage, the computer program product comprising:
a non-transitory computer readable storage medium having computer usable program code embodied therewith, the computer usable program code comprising:
computer usable program code that monitors a total environmental consumption within an information technology resource;
computer usable program code that determines a percentage of the information technology resource used by a customer;
computer usable program code that determines an environmental factor by multiplying the percentage of the information technology resource used by the customer with the total environmental consumption within the information technology resource and integrates the product over a billing period;
computer usable program code that determines a unified pricing structure based on an information technology factor by summing a total network usage, a total storage usage, and a total processor usage for the customer over the billing period, using byte-based utility computing; and
computer usable program code that determines a total bill for the customer according to the environmental factor and the information technology factor.

14. The computer program product of claim 13, further comprising computer usable program code that determines an efficiency ratio by dividing the information technology factor by the environmental factor.

15. The computer program product of claim 14, further comprising computer useable program code that determines a work-to-environmental efficiency using the efficiency ratio.

16. The computer program product of claim 13, wherein the network usage is metered in megabits per second.

17. The computer program product of claim 13, wherein the storage usage data is metered in gigabytes per day.

18. The computer program product of claim 13, wherein the processor usage data is measured in bytes per second.

19. The method of claim 1, in which the total environmental consumption is the amount of energy required to power and cool the environment housing the hardware within the information technology resource.

* * * * *